(12) United States Patent
Muchherla et al.

(10) Patent No.: US 11,782,847 B2
(45) Date of Patent: *Oct. 10, 2023

(54) PERFORMING A MEDIA MANAGEMENT OPERATION BASED ON A SEQUENCE IDENTIFIER FOR A BLOCK

(71) Applicant: Micron Technology, Inc., Boise, ID (US)

(72) Inventors: Kishore Kumar Muchherla, San Jose, CA (US); Peter Feeley, Boise, ID (US); Sampath K. Ratnam, San Jose, CA (US); Ashutosh Malshe, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,138

(22) Filed: Aug. 29, 2022

(65) Prior Publication Data

US 2022/0414021 A1   Dec. 29, 2022

Related U.S. Application Data

(63) Continuation of application No. 16/739,983, filed on Jan. 10, 2020, now Pat. No. 11,467,980.

(51) Int. Cl.
*G06F 12/123* (2016.01)
*G06F 12/02* (2006.01)
*G06F 11/30* (2006.01)

(52) U.S. Cl.
CPC ........ *G06F 12/123* (2013.01); *G06F 11/3037* (2013.01); *G06F 12/0246* (2013.01);
(Continued)

(58) Field of Classification Search
CPC .......... G06F 12/02469; G06F 12/0253; G06F 12/0651; G06F 2212/70; G06F 2212/7205; G06F 2212/7211
See application file for complete search history.

(56) References Cited

U.S. PATENT DOCUMENTS

| 10,318,414 B2 | 6/2019 | Bellorado et al. |
| 2008/0147998 A1 | 6/2008 | Jeong |

(Continued)

FOREIGN PATENT DOCUMENTS

KR    20190030463 A    3/2019

OTHER PUBLICATIONS

International Search Report and Written Opinion for International Application No. PCT/US2021/012801, dated May 6, 2021, 9 pages.

*Primary Examiner* — Tracy A Warren
(74) *Attorney, Agent, or Firm* — Lowenstein Sandler LLP

(57) ABSTRACT

A first block that is assigned a first sequence identifier can be identified. A determination can be made as to whether the assigned first sequence identifier satisfies a threshold sequence identifier condition that corresponds to a difference between the first sequence identifier assigned to the first block and second sequence identifier assigned to a second block. In response to determining that the assigned first sequence identifier satisfies the threshold sequence identifier condition, a media management operation can be performed on the first block.

20 Claims, 7 Drawing Sheets

(52) U.S. Cl.
CPC ...... *G06F 12/0253* (2013.01); *G06F 2212/70* (2013.01); *G06F 2212/7205* (2013.01); *G06F 2212/7209* (2013.01)

(56) References Cited

U.S. PATENT DOCUMENTS

| | | |
|---|---|---|
| 2011/0264843 A1 | 10/2011 | Haines et al. |
| 2014/0032817 A1 | 1/2014 | Bux et al. |
| 2014/0181376 A1 | 6/2014 | Miyamoto et al. |
| 2015/0026389 A1* | 1/2015 | Li ................ G06F 12/0246 711/103 |
| 2015/0261671 A1 | 9/2015 | Chu et al. |
| 2018/0232176 A1 | 8/2018 | Dreyer et al. |
| 2018/0373438 A1 | 12/2018 | Bennett et al. |
| 2019/0294341 A1 | 9/2019 | Sunata et al. |
| 2020/0097403 A1 | 3/2020 | Saxena et al. |

* cited by examiner

FIG. 4A

Data Block 410

| V | V | V |
|---|---|---|
| V | V | V |
| V | X | X |

Data Block 412

| V | V | V |
|---|---|---|
| V | V | X |
| X | X | X |

Data Block 414

| V | V | V |
|---|---|---|
| V | V | V |
| X | X | X |

Data Block 420

| | | |
|---|---|---|
| | | |
| | | |

Data Block 422

| | | |
|---|---|---|
| | | |
| | | |

FIG. 4B

Data Block 410

| | | |
|---|---|---|
| | | |
| | | |

Data Block 412

| V | V | V |
|---|---|---|
| V | V | X |
| X | X | X |

Data Block 414

| V | V | V |
|---|---|---|
| V | V | V |
| X | X | X |

Data Block 420

| V | | |
|---|---|---|
| V | V | V |
| V | V | V |

Data Block 422

| | | |
|---|---|---|
| | | |
| | | |

FIG. 4C

Data Block 410

Data Block 412

Data Block 414

| V | V | V |
|---|---|---|
| V | V | V |
| X | X | X |

Data Block 420

| V | V | V |
|---|---|---|
| V | V | V |
| V | V | V |

Data Block 422

|   |   |   |
|---|---|---|
|   |   |   |
| V | V | V |

FIG. 4D

Data Block 410

Data Block 412

Data Block 414

Data Block 420

| V | V | V |
|---|---|---|
| V | V | V |
| V | V | V |

Data Block 422

| V | V | V |
|---|---|---|
| V | V | V |
| V | V | V |

PERFORMING A MEDIA MANAGEMENT OPERATION BASED ON A SEQUENCE IDENTIFIER FOR A BLOCK

RELATED APPLICATIONS

This application is a continuation of U.S. patent application Ser. No. 16/739,983, filed Jan. 10, 2020, the entire contents of which are hereby incorporated by reference herein.

TECHNICAL FIELD

Embodiments of the disclosure relate generally to memory sub-systems, and more specifically, relate to performing a media management operation based on a sequence identifier for a block.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIGS. 4A-4D illustrate an example of consolidating valid data from cold static blocks in accordance with some embodiments of the present disclosure.

DETAILED DESCRIPTION

Figure 1:
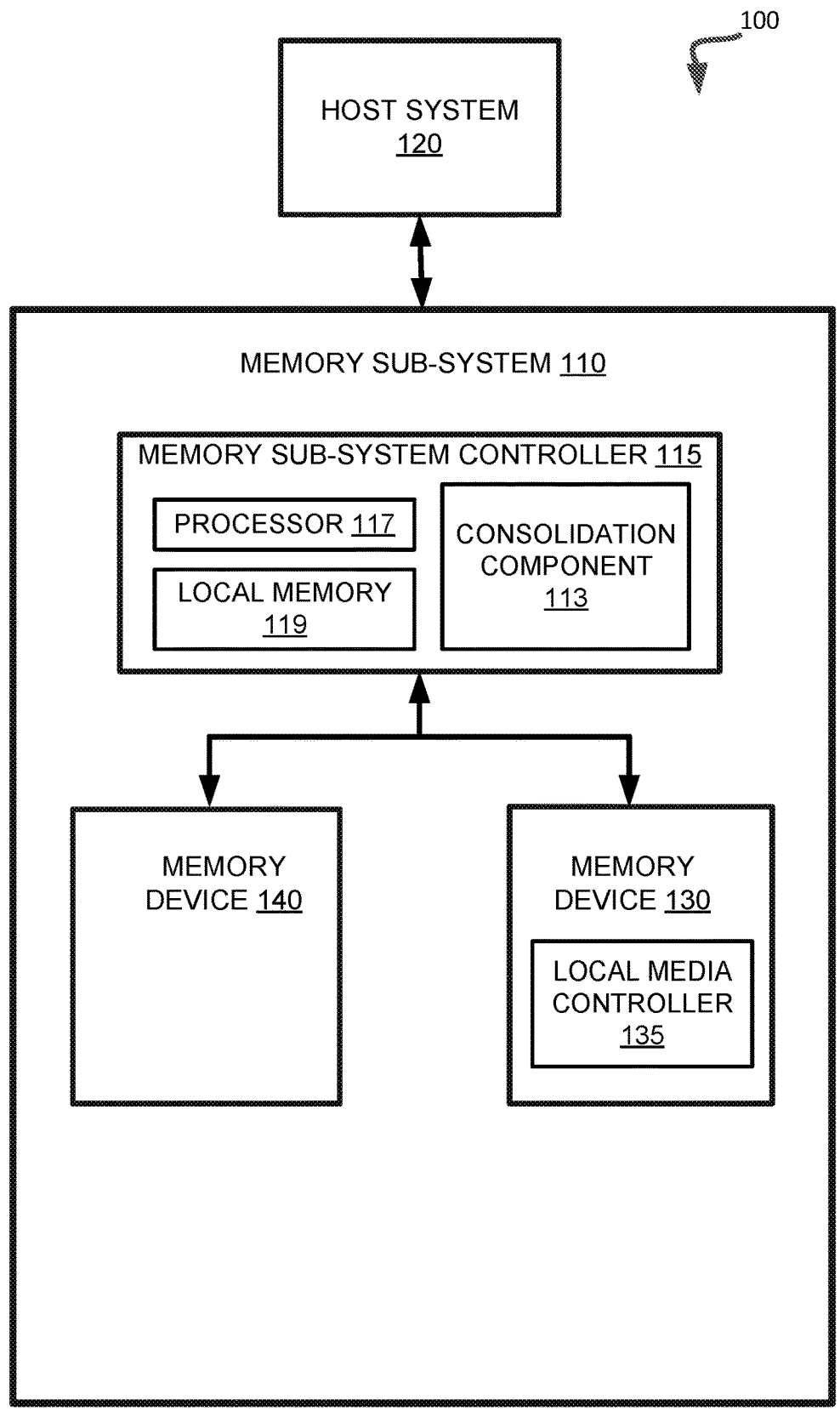
FIG. 1 illustrates an example computing system that includes a memory sub-system in accordance with some embodiments of the present disclosure.

Aspects of the present disclosure are directed to performing a media management operation based on a sequence identifier for a block. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time. A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

Since garbage collection can write the valid data to a different block before the block is erased, data can be rewritten many times to different blocks at the memory sub-system. The amount of additional rewrites of data in the memory sub-system is referred to herein as write-amplification. Write-amplification can reduce the operating life of a memory sub-system. To reduce write-amplification, the memory sub-system can include some amount of additional blocks in excess to a total number of blocks that are available at any single time to store data from the host system. Such additional blocks can be considered over-provisioning. A larger amount of over-provisioning can significantly reduce write-amplification as the number of times that data is rewritten within the memory sub-system due to garbage collection attempting to free up blocks is reduced.

"Garbage collection operation" hereinafter refers to selecting a block, rewriting the valid data from the selected block to a new block, and erasing all invalid data and valid data stored at the selected block. The valid data from multiple selected blocks can be copied to a smaller number of new blocks and the selected blocks can then be erased. As a result, the number of blocks that have been erased can be increased so that more blocks are available to store subsequent data from a host system.

To select a block on which the garbage collection operation is to be performed, the conventional memory sub-system selects the block with the least amount of valid data as less valid data is required to be rewritten from the selected block to a new block before the selected block is erased. In some circumstances, a block can include data that is valid for a relatively long period of time. Such data is referred to as cold data. If a block includes a large amount of valid cold data, then the garbage collection operation may not be performed on the block. As a result, fewer garbage collection operations are performed on the block compared to other blocks with lesser amounts of valid data that will be selected by the garbage collection operation. Since the garbage collection operation is not performed on the blocks with large amounts of valid cold data, a significant amount of the capacity of the memory sub-system is locked up in blocks that contain some amount of invalid along with the valid cold data. The number of blocks that store cold data reduces the amount of overprovisioning in the memory sub-system and therefore causes an increase in write-amplification as additional write operations are performed on other blocks and are not performed on the blocks with the valid cold data.

Aspects of the present disclosure address the above and other deficiencies by performing a garbage collection operation based on a sequence identifier (e.g., number) for a block. The performance of such a garbage collection operation can increase the operating lifespan of the memory sub-system by increasing the amount of available blocks that can store data from a host system and thus decrease write amplification. The reduced write amplification can provide for improved performance of the memory sub-system as fewer write operations are performed as part of the garbage collection operation.

The garbage collection operation can select a block to be erased so that the block can be made available to store subsequent data from a host system. For example, the memory sub-system can identify blocks that have large version gaps that indicate that a respective block includes cold data. The identified blocks can then be garbage collected. The valid data garbage collected from the identified blocks is then consolidated into fewer blocks to reduce the number of blocks that store cold data.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DEVIM (SO-DIMM), and various types of non-volatile dual in-line memory modules (NVDIMMs). The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory system controller 115 (or controller for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA)) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 (and or memory device 140) include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a consolidation component 113 that can be used to consolidate cold data from cold static blocks to perform a garbage collection operation in the memory sub-system 110. In some embodiments, the memory sub-system controller 115 includes at least a portion of the consolidation component 113.

The consolidation component 113 can determine whether a sequence number assigned to a block satisfies a threshold sequence number condition. The consolidation component 113 can determine whether the block satisfies a valid data criterion. The consolidation component 113 can then garbage collect the block and consolidate valid data into specified cold blocks. Further details with regards to the operations of the consolidation component 113 are described below.

Figure 2:
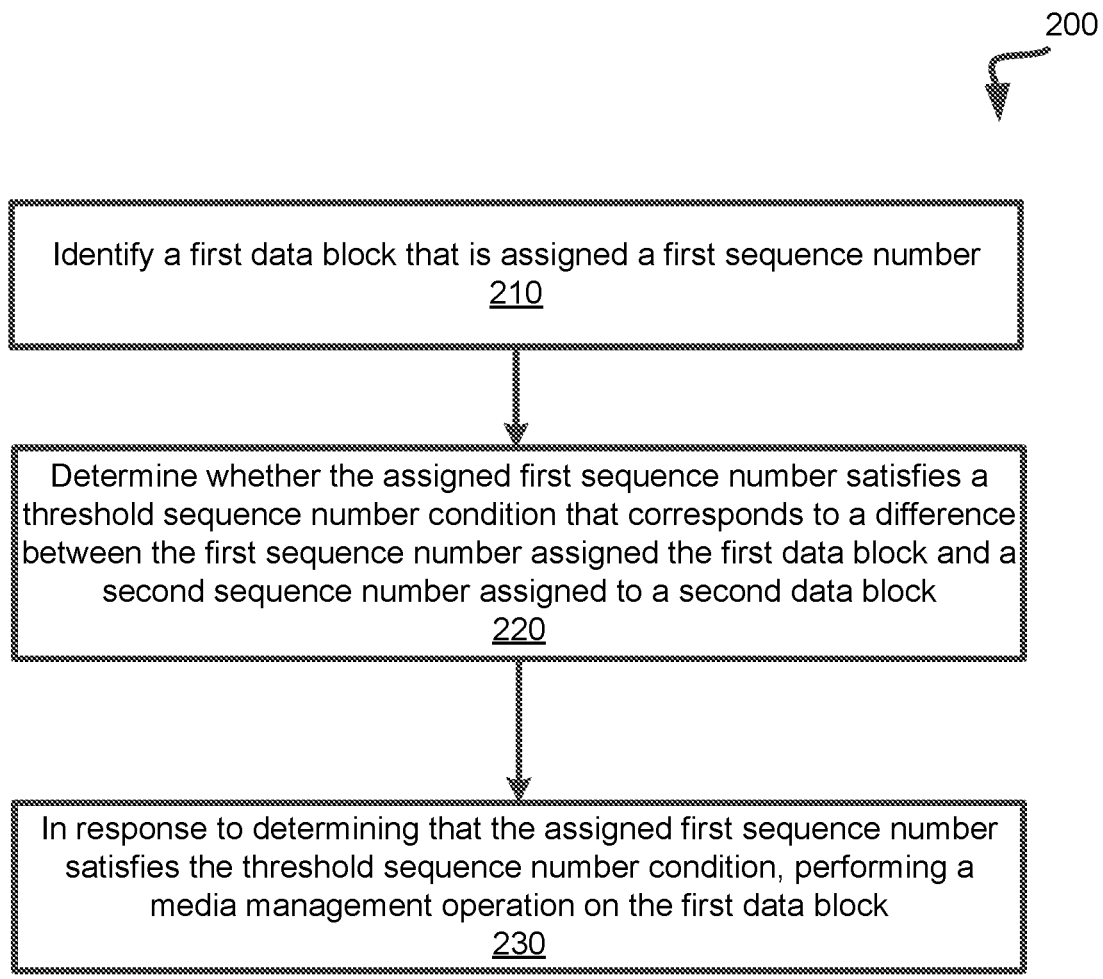
FIG. 2 is a flow diagram of an example method to perform a media management operation based on a sequence identifier for a block in accordance with some embodiments of the present disclosure.

FIG. 2 is a flow diagram of an example method 200 to perform a media management operation based on a sequence number for a block in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the consolidation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic identifies a first block that is assigned a first sequence number. The first block can include both valid and invalid data. A sequence number can be assigned to a block each time a block is written to and therefore the first sequence number corresponds to a length of time since the first block was last written to. In some embodiments, a memory sub-system can increment a sequence number for each write operation that is performed to store data at a block. The incremented sequence number can then be assigned to the block storing the data of the corresponding write operation. In the same or alternative embodiments, the sequence number can be incremented for each operation (e.g., write operation, read operation, erase operation) that is performed by the memory sub-system. Thus, the sequence number can be indicative of when a write operation has been performed relative to other operations that have been performed by the memory sub-system. The valid data stored in the first block can be all, or at least partially, cold data.

At operation 220, the processing logic determines whether the first sequence number satisfies a threshold sequence number condition. The threshold sequence number condition corresponds to a difference between the first sequence number assigned to the first block and a second sequence number assigned to a second block. In some embodiments, the first sequence number satisfies the threshold sequence number condition when the first sequence number assigned to the first block is equal to or exceeds a threshold difference between the sequence numbers. The first sequence number does not satisfy the threshold sequence number condition when the first sequence number assigned to the first block is less than the threshold difference between the sequence numbers. For example, the threshold sequence number can be a minimum specified difference between the first and second sequence numbers. The second block can be the last block that the memory sub-system has written to. Therefore, the difference between the first and second sequence numbers represents a number of write operations (or number of any operations) that have occurred since the first block was last written to, or "programmed." The difference can be referred to as a "version gap." The version gap can become large enough to satisfy the threshold sequence number when the first block contains some amount of cold data such that the first block is not garbage collected under normal garbage collection criteria.

At operation 230, in response to determining that the assigned first sequence number satisfies the threshold sequence number condition, the processing logic performs a media management operation, such as a garbage collection operation, on the first block. For example, the memory sub-system can copy the valid data stored in the first block to a destination block and then erase the first block. The valid data copied from the first block can be mostly, if not all, cold data. The destination block can be a block that is assigned to store cold data. The destination block can be randomly designated, or alternatively can be selected based on previous use of the destination block. Multiple destination blocks can be designated at any one time and different destination blocks can be designated at different times. The destination block can store valid data that is garbage collected from blocks containing cold valid data. Thus, cold valid data collected from blocks that meet the threshold sequence number condition can be consolidated into one or more blocks, such as the destination block, that are assigned to store consolidated cold data. In some instances, the memory sub-system performs the garbage collection operation on the first block only if the first block contains a minimum or maximum amount of valid data.

Figure 3:
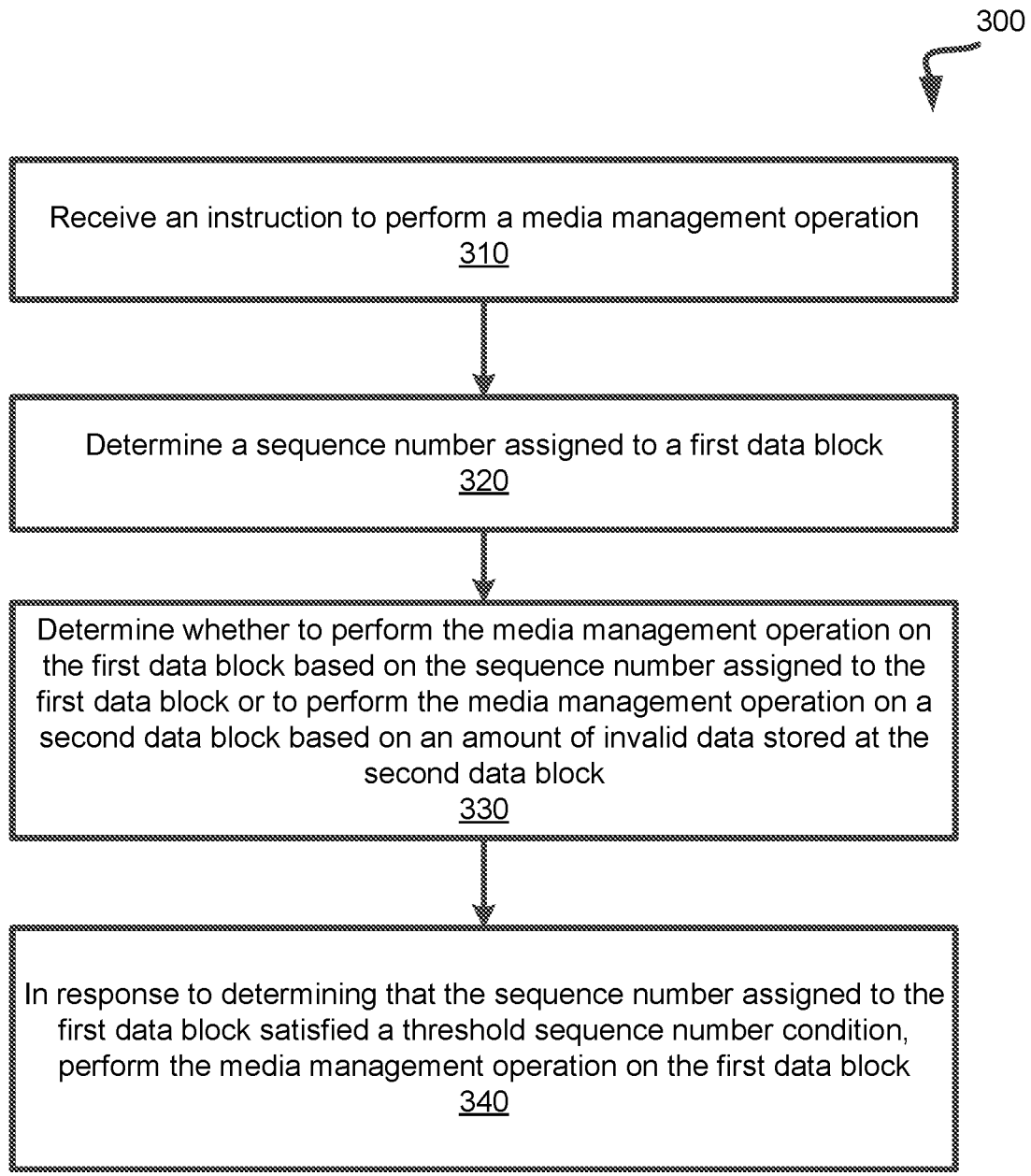
FIG. 3 is a flow diagram of an example method to determine whether to perform a media management operation on a block based on a sequence identifier in accordance with some embodiments of the present disclosure.

FIG. 3 is a flow diagram of an example method 300 to determine whether to perform a media management operation on a block based on a sequence number, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the consolidation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives an instruction to perform a media management operation, such as a garbage collection operation. The garbage collection operation is an operation to copy valid data from a source block to a destination block and then erase the source block. Garbage collection helps to remove invalid data stored in a memory sub-system. At operation 320, the processing logic determines a sequence number that is assigned to a first block. The sequence number represents the last time data was written to the first block. A sequence number can be assigned to the block each time that data is written to the block. Thus, the sequence number can represent a relative age of the data in the block with respect to other data stored at other blocks at the memory sub-system.

At operation 330, the processing logic determines whether to perform the media management operation on the first block based on the sequence number assigned to the first block or to perform the media management operation on a second block based on an amount of invalid data stored at the second block. The determination can be based on a difference between the sequence number assigned to the first block and a sequence number assigned to the block that was most recently written to by the memory sub-system. The difference can represent a number of block that have been written to since the first block was last written to. In one embodiment, if the difference between the sequence number assigned to the first block and the sequence number assigned to the block most recently written to is larger than a threshold sequence number difference then the garbage collection operation will be performed on the first block. Alternatively, if the difference does not meet the threshold sequence number difference then the garbage collection will not be performed on the first block. Rather, the garbage collection operation can select a second block based on the amount of invalid data stored at the second block. For example, the second block can be a block that contains the largest amount of invalid data, or the least amount of valid data. The determination can additionally be based on an amount of valid data that is stored in the first block. For example, if the first block contains a very high amount of valid data (e.g., 99.9%) then the garbage collection operation is not done on the first block. Thus, the criteria used to select the block for the garbage college operation can be changed based on the sequence number assigned to the block.

At operation 340, processing logic performs the media management operation on the first block in response to determining that the sequence number assigned to the first block satisfies a threshold sequence number condition. As described above, the threshold sequence number condition can be a difference between the sequence number assigned to the first block and the sequence number of the last block that was written to. Thus, the threshold sequence number condition can be satisfied if the difference between the sequence number of the first block and the sequence number of the last block is equal to or larger than the threshold sequence number difference. The threshold sequence number condition is not satisfied if the difference between the sequence number of the first block and the sequence number of the last block is less than the threshold sequence number difference. Upon performing the garbage collection operation, the valid data is consolidated with valid data from other block that have been garbage collected based on a sequence number. The consolidation of the valid data can free up memory in the system because less memory is trapped as invalid data in cold blocks.

FIGS. 4A-4D illustrate an example series of operations to consolidate valid data from cold static blocks in accordance with some embodiments of the present disclosure. Referring to FIG. 4A, blocks 410, 412, and 414 each store some amount of valid data and invalid data where valid data is represented by "v" and invalid data is represented by "x". Blocks 420 and 422 can initially be empty, not storing any data. For example, blocks 420 and 422 could have been recently been garbage collected and/or erased. Each sub-block of the blocks 410, 412, 414, 420, and 422 can be a unit of storage (e.g., a word line, a page, etc.). FIG. 4A depicts the blocks prior to a garbage collection operation being performed on the blocks 410, 412, and 414.

Referring to FIG. 4B, block 410 has been garbage collected and the valid data that was stored at block 410 in FIG. 4A is now stored at block 420. As described above in FIG. 2 and FIG. 3, the block 410 is garbage collected based on a sequence number assigned to block 410. Accordingly, the valid data from block 410 is copied to block 420, after which the data at block 410 is erased. The valid data copied from block 410 to block 420 is likely to be mostly cold data because the garbage collection operation was done based on the sequence number. Block 420 and 422 can each be designated as blocks to store cold data that is garbage collected so that cold data is consolidated in blocks 420 and 422. Referring to FIG. 4C, the valid data that was stored at block 412 in FIG. 4B has been copied into block 420 and block 422. Similar to FIG. 4B, a garbage collection operation performed on block 412 can copy the valid data of block 412 to the designated cold blocks 420 and 422 and erase the data at block 412. The valid data can be partially copied to block 420 and partially to block 422.

Referring to FIG. 4D, the valid data from block 414 has been copied into block 422. All the valid data that was originally stored in blocks 410, 412, and 414 in FIG. 4A now resides in blocks 420 and 422. The cold valid data from the cold blocks is therefore consolidated into as few blocks as possible. Accordingly, the amount of available blocks that can store subsequent data has increased by 50% from 2 full blocks to 3 full blocks. Each of the blocks 410, 412, and 414 has been garbage collected and the valid data consolidated into blocks 420 and 422. It should be noted that FIGS. 4A-4D are illustrative and should not be construed as limited to the operations depicted. Other operations can occur throughout each of the operations depicted (e.g., read and write operations). Additionally, each of the blocks depicted can be located anywhere in a memory sub-system and are not required to be proximate to one another.

Figure 5:
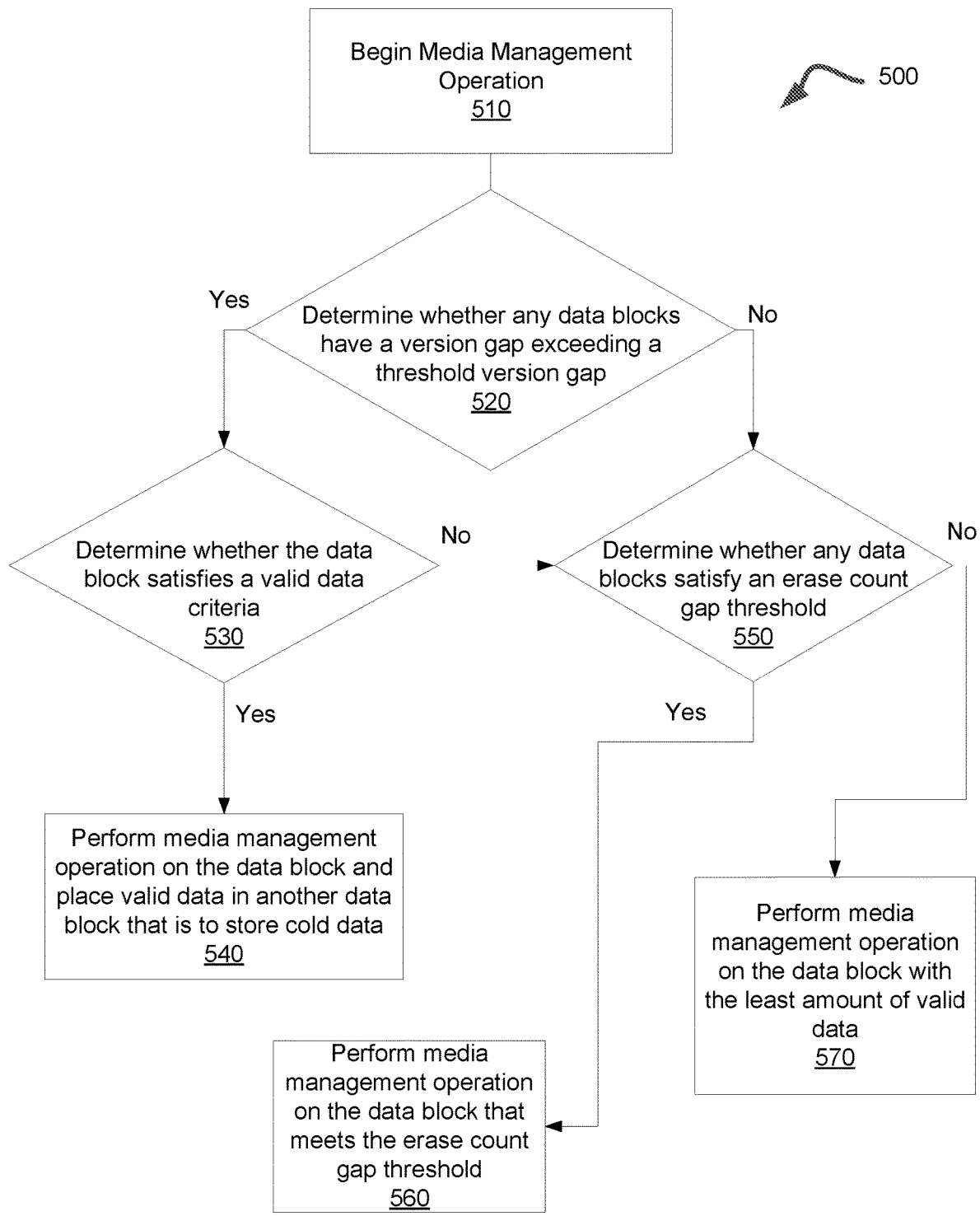
FIG. 5 is a flow diagram of an example method to consolidate cold blocks through consolidating valid data from the cold blocks in accordance with some embodiments of the present disclosure.

FIG. 5 is a flow diagram of an example method 500 to consolidate cold blocks with invalid data, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the consolidation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logics begins a media management operation, such as a garbage collection operation. A garbage collection operation can copy valid data of a block to a destination block and erase the data at the block. The garbage collection operation is used to free up blocks with invalid data.

At operation 520, the processing logic determines whether any blocks have a version gap exceeding a threshold version gap. A version gap represents the relative age of data in a block with respect to data of other blocks. The version gap can be the difference between a sequence number of a block and the latest sequence number assigned to the last block that was written to. Alternatively, the version gap can be the difference between the next sequence number that is to be assigned and the sequence number assigned to a block. If a version gap of a block exceeds the threshold version gap then the block can contain cold data preventing the block from being garbage collected under normal conditions (i.e., the block with the least amount of valid data is garbage collected).

At operation 530, if a version gap of a block exceeds the threshold version gap at operation 520, then the processing logic determines whether the block satisfies a valid data criteria. The valid data criteria can be a range of valid data (e.g., a minimum percentage of valid data and a maximum percentage of valid data) that is stored at the block. The valid data criteria can be a maximum amount of valid data, ratio of valid data to invalid data stored at the block, or percentage of valid data or invalid data. Thus, the valid data criteria can be satisfied by a block with an amount of valid data that falls within the range defined by the valid data criteria (i.e., more than a minimum amount and less than a maximum amount). The valid data criteria is not satisfied by a block with an amount of valid data that is outside of the range defined by the valid data criteria (i.e., more than a minimum amount and less than a maximum amount). At operation 540, if the block meets both the threshold version gap and satisfies the valid data criteria, then the processing logic performs the media management operation (e.g., the garbage collection operation) on the block. The garbage collection operation copies the valid data from the data to a destination block that is to store valid cold data. Once the valid data is copied, the data at the block is erased.

At operation 550, if either the version gap threshold is not exceeded or the valid data criteria is not satisfied for any block, then the processing logic determines whether any blocks satisfy an erase count gap threshold. The erase count gap threshold can be satisfied by a block with an erase count gap that exceeds or is equal to the erase count gap threshold. The erase count gap is the erase count difference between the block with most number of erases and the block with the least number of erases. The erase count can be used as a proxy for the age of the block. As it can be desirable for the blocks to experience wear evenly, if any block has a smaller erase count (e.g., because it was not picked for garbage collection due to an inherently larger amount of valid data when compared to other blocks), the system can forcibly perform garbage collection on that block for wear leveling purposes in spite of the larger amount of valid data. The erase count gap threshold is not satisfied by a block with an erase count gap that does not exceed the erase count gap threshold. If a block satisfies an erase count gap threshold then a wear leveling operation can be initiated. Wear leveling can be another operation performed on blocks that have a low erase count in comparison to other blocks (and thus a large erase count gap). Thus, wear leveling is utilized to more evenly distribute write operations across blocks so that all blocks have a similar operational lifespan as a result of having a similar number of write operations performed within a defined period of time.

At operation 560, if a block has an erase count gap that satisfies the erase count gap threshold then the processing logic performs the media management operation on the block that meets the erase count gap threshold (i.e. wear leveling). At operation 570, if none of the blocks meet the erase count gap threshold then the processing logic performs the media management operation on the data bock with the least amount of valid data. The least amount of valid data can be the least absolute amount of valid data or a lowest ratio of valid to invalid data. Similarly, the garbage collection operation could be performed on the block with the largest amount of invalid data.

Figure 6:
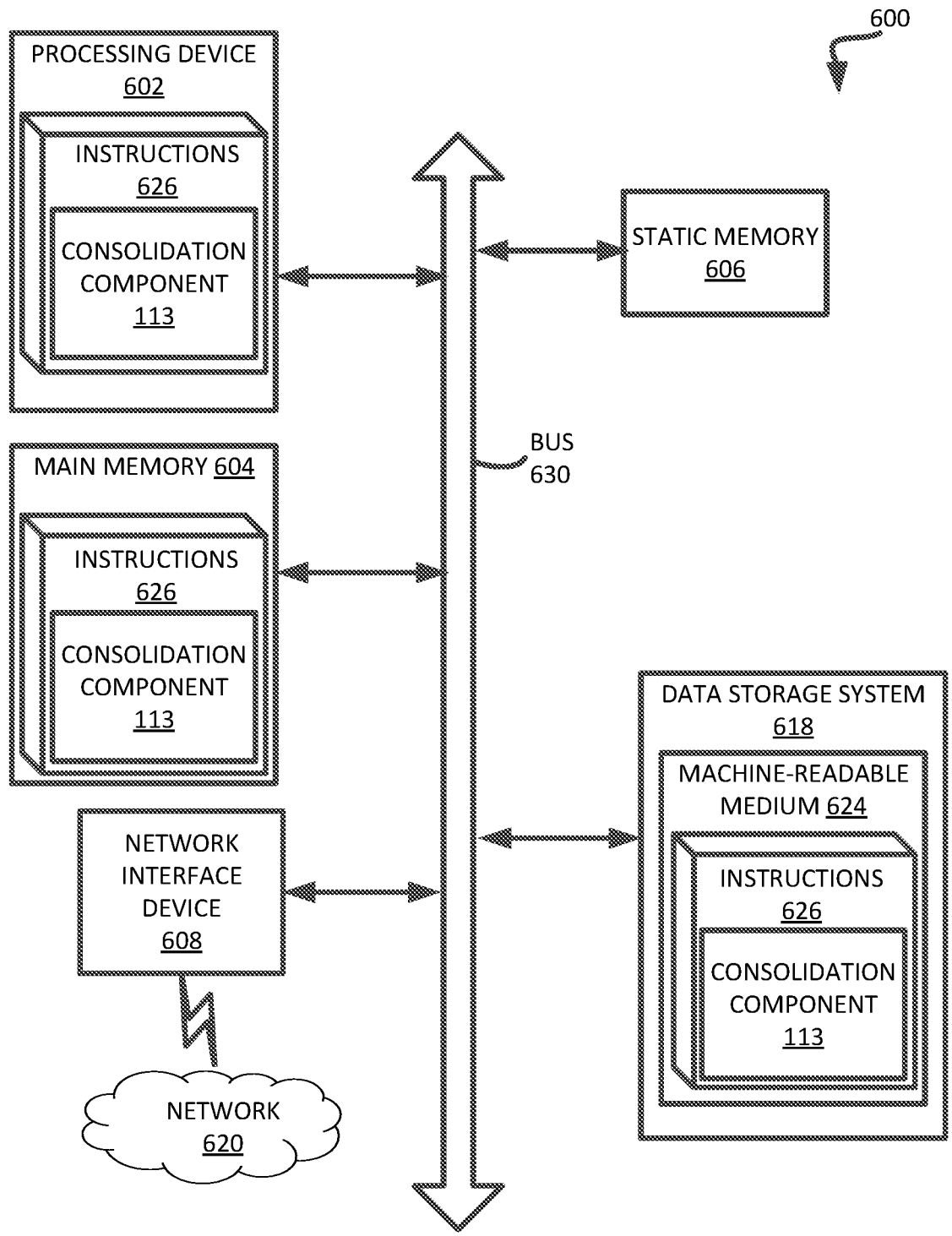
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the consolidation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a consolidation component (e.g., the consolidation component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   identifying a first segment of a memory device for which an associated version gap is less than a version gap threshold and an associated amount of valid data is outside a defined range;
   determining, by a processing device, whether an erase count gap associated with the first segment exceeds an erase count gap threshold; and
   in response to determining that the erase count gap exceeds the erase count gap threshold, performing a media management operation on the first segment.

2. The method of claim 1, wherein the associated version gap is defined by a difference between a first sequence identifier of the first segment and a second sequence identifier of a last block of the memory device to which data has been written.

3. The method of claim 1, wherein the associated version gap represents a relative age of data in the first segment with respect to data in other segments of the memory device.

4. The method of claim 1, wherein the associated amount of valid data is outside the defined range when the associated amount of valid data is either less than a minimum amount of valid data or greater than a maximum amount of valid data.

5. The method of claim 1, wherein the erase count gap associated with the first segment is defined by a difference between a first number of erase operations performed on the first segment and a highest number of erase operations performed on any other segment of the memory device.

6. The method of claim 1, wherein performing the media management operation comprises performing a garbage collection operation corresponding to storing the valid data from the first segment on another segment of the memory device for which an associated erase count gap exceeds the erase count gap threshold.

7. The method of claim 1, further comprising:
   in response to determining that the erase count gap does not exceeds the erase count gap threshold, performing the media management operation on a segment of the memory device having a least amount of valid data.

8. A non-transitory computer-readable storage medium comprising instructions that, when executed by a processing device, cause the processing device to perform operations comprising:
   identifying a first segment of a memory device for which an associated version gap is less than a version gap threshold and an associated amount of valid data is outside a defined range;
   determining, by a processing device, whether an erase count gap associated with the first segment exceeds an erase count gap threshold; and
   in response to determining that the erase count gap exceeds the erase count gap threshold, performing a media management operation on the first segment.

9. The non-transitory computer-readable storage medium of claim 8, wherein the associated version gap is defined by a difference between a first sequence identifier of the first segment and a second sequence identifier of a last block of the memory device to which data has been written.

10. The non-transitory computer-readable storage medium of claim 8, wherein the associated version gap represents a relative age of data in the first segment with respect to data in other segments of the memory device.

11. The non-transitory computer-readable storage medium of claim 8, wherein the associated amount of valid data is outside the defined range when the associated amount of valid data is either less than a minimum amount of valid data or greater than a maximum amount of valid data.

12. The non-transitory computer-readable storage medium of claim 8, wherein the erase count gap associated with the first segment is defined by a difference between a first number of erase operations performed on the first segment and a highest number of erase operations performed on any other segment of the memory device.

13. The non-transitory computer-readable storage medium of claim 8, wherein performing the media management operation comprises performing a garbage collection operation corresponding to storing the valid data from the first segment on another segment of the memory device for which an associated erase count gap exceeds the erase count gap threshold.

14. The non-transitory computer-readable storage medium of claim 8, wherein the instructions cause the processing device to perform operations further comprising:
  in response to determining that the erase count gap does not exceeds the erase count gap threshold, performing the media management operation on a segment of the memory device having a least amount of valid data.

15. A system comprising:
  a memory device;
  a processing device, operatively coupled with the memory device, to perform operations comprising:
    identifying a first segment of a memory device for which an associated version gap is less than a version gap threshold and an associated amount of valid data is outside a defined range;
    determining, by a processing device, whether an erase count gap associated with the first segment exceeds an erase count gap threshold; and
    in response to determining that the erase count gap exceeds the erase count gap threshold, performing a media management operation on the first segment.

16. The system of claim 15, wherein the associated version gap is defined by a difference between a first sequence identifier of the first segment and a second sequence identifier of a last block of the memory device to which data has been written.

17. The system of claim 15, wherein the associated version gap represents a relative age of data in the first segment with respect to data in other segments of the memory device.

18. The system of claim 15, wherein the associated amount of valid data is outside the defined range when the associated amount of valid data is either less than a minimum amount of valid data or greater than a maximum amount of valid data.

19. The system of claim 15, wherein the erase count gap associated with the first segment is defined by a difference between a first number of erase operations performed on the first segment and a highest number of erase operations performed on any other segment of the memory device.

20. The system of claim 15, wherein performing the media management operation comprises performing a garbage collection operation corresponding to storing the valid data from the first segment on another segment of the memory device for which an associated erase count gap exceeds the erase count gap threshold.

* * * * *